Aug. 14, 1951     L. J. SEACAT     2,564,508
INCUBATOR
Filed July 11, 1947     2 Sheets-Sheet 1
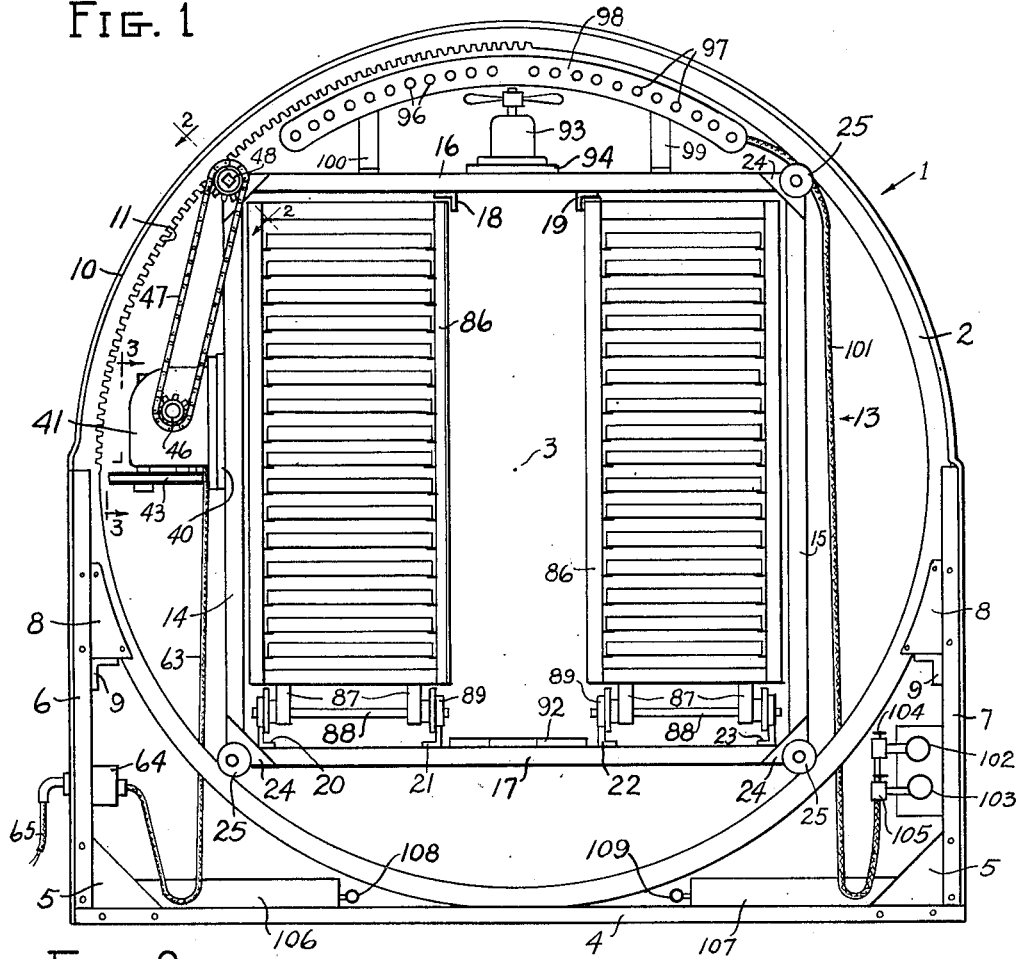
Inventor
LOT J. SEACAT
By Elizabeth Newton Dew
Attorney Inventor
LOT J. SEACAT
By Elizabeth Newton Dew
Attorney Patented Aug. 14, 1951

2,564,508

UNITED STATES PATENT OFFICE 2,564,508

INCUBATOR

Lot J. Seacat, Ramsey, Ind.

Application July 11, 1947, Serial No. 760,266

6 Claims. (Cl. 119—35)

This invention relates to incubators for hatching poultry eggs. The hatching of eggs is now a vast mass production industry in which many millions of eggs are hatched annually by incubation. In a customary procedure, the eggs to be hatched are transferred from standard crates to hatching trays. These trays are then loaded into an incubator. The frame carrying these trays within the incubator may be tiltable; or mechanism may be provided for tilting the trays periodically in order to effect the movement of the eggs necessary for hatching. However, as is well known, the eggs must remain motionless during the final 3 of the 21-day hatching period. Where continuous hatching is being done, it is necessary, just prior to the final 3 days, to transfer the trays of eggs to another incubator in order that these eggs which have been in the incubator less than 19 days, may be periodically moved. This transfer involves a large amount of time, expense, and added equipment and, furthermore, involves the possibility of loss because of breakage and careless handling of the trays or eggs.

It is accordingly the main and general purpose of my invention to provide an incubator in which the drawbacks inherent in the prior art incubators, as just described, are eliminated.

More specifically, it is an object of the invention to provide an incubator wherein the eggs and their trays are untouched from the time they are first placed in the machine until the eggs are hatched.

Another object is to provide an incubator adapted, without structural change, to the simultaneous hatching of a full capacity of eggs, or to the sequential hatching of a predetermined number of eggs at different times.

A further object is the provision of an incubator which can be constructed in sections and to which sections may be added as desired by the owner, when it is desired to expand the capacity of the machine.

A still further object is the provision of an incubator wherein a great saving of labor and costs of operation may be effected over the prior art machines.

Yet another object is to provide an incubator in which axially aligned sections may as desired be simultaneously oscillated to move the eggs or leave them quiescent during the final hatching period.

Other objects and advantages of my invention will become apparent after a study of the following description.

In the drawings:

Figure 1 is an elevation of the front end of the incubator, the front wall being removed to illustrate the mounting of the truck supporting frame and the power drive thereto.

Figure 2 is a sectional detail view showing to an enlarged scale the roller mounting of two adjacent incubator sections together with their connecting sleeve, substantially as viewed in a plane indicated by line 2—2, Figure 1.

Figure 6 is a detail view showing a portion of the end of an egg truck.

Figure 5:
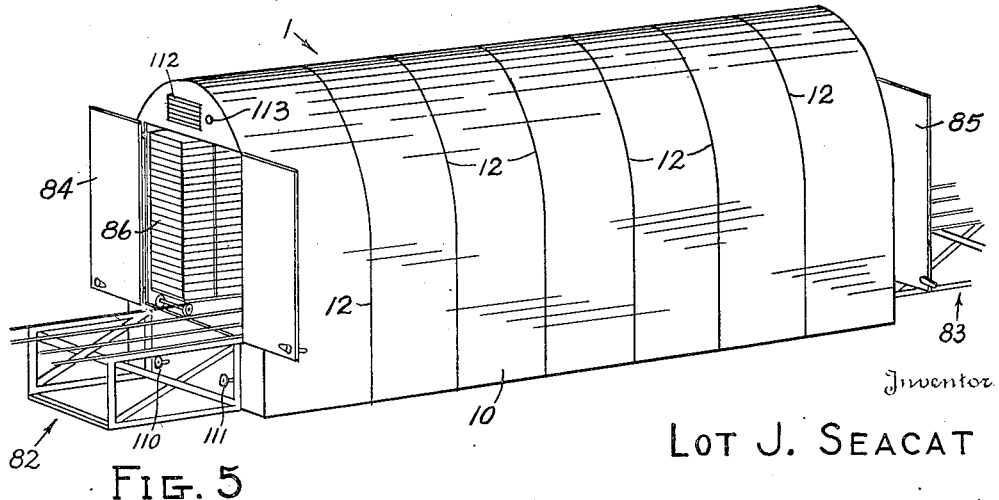
Figure 5 is a perspective view of a complete machine using seven incubator sections or units.

Referring in detail to the drawing, 1 indicates generally a housing which may consist of a plurality of circular tracks such as 2, spaced along and concentric of a common central axis 3, Figure 1. In the model illustrated each track comprises a channel bent into form with its flanges inwardly. Each track may be supported by a base channel 4 to the ends of which are connected by brace plates 5, uprights 6 and 7. These uprights may be simple angles and have a length approximately equal to the radius of tracks 2 and secured to the tracks by plates 8. In the model shown, the tracks 2 have a diameter of approximately 8½ feet and the number required is one more than the number of incubator sections used. Thus, where seven sections are employed, as shown at Figure 5, eight circular tracks and supports will be used.

The circular tracks 2 are secured in aligned preferably equally spaced position by any suitable means such as longitudinal stringers 9, assisted, of course by outer covering or sheathing 10 which may be of plastic, plywood, or sheet metal, corrugated or plain. By this means the housing is united into a rigid unit comprising a selected number of sections each a little more than two feet and three inches in axial dimension.

Thus the over-all length or axial dimension of the machine illustrated is about sixteen feet.

Each circular track 2 has the edges of its flanges smoothed and one flange of each track has gear teeth formed therein over 90° of arc, as indicated at 11, Figures 1 and 2. Preferably this rack is formed in the upper left quadrant although it may be formed over any other portion of the track and may be greater or less than 90°.

The dividing lines between sections are indicated at 12, Figure 5, and it will be understood that a plane through each section line 12 will pass midway between the flanges of the corresponding track 2.

Each incubator section includes a rectangular frame generally indicated at 13. The frame is square in the model shown and is about six feet on a side. Each frame is built up of angle sections, including verticals 14 and 15 connected at top and bottom by horizontals 16 and 17 to form squares. There are two squares in each section frame, connected in spaced parallel relation by longitudinal angle bars 18 and 19 at the top and similar angle bars 20, 21, 22 and 23 at the bottom. Top bars 18 and 19 are so positioned as to act as guides and abutments to positively prevent tipping of or side movement of the egg trucks during oscillation, while bars 20 to 23, inclusive, are spaced to form pairs of tracks on which the trucks are guided. It will be understood that, when all sections are in corresponding rotational positions, the corresponding bars 18, 19, etc., are in alignment to form, in effect, continuous guides and tracks longitudinally throughout the housing. Because of the fact that tracks 2 do not permit any substantial deformation of frames 13, it is not essential that the verticals 14, 15 and horizontals 16 and 17 be connected with great rigidity and I have shown them as connected by simple gusset or corner plates 24, riveted or welded in place. Indeed some slight deformation of the rectangular frames 13 may be desirable to accommodate possible irregularities in the tracks 2.

In the model shown, and referring to Figure 1, the right upper and lower plates 24 and the left lower plate 24, are provided with bearings, plain or antifriction, each of which journals a grooved roller 25 each fitting over the flange of a track, in the same manner as is indicated at 26, Figure 2. Thus, for example, the upper, right rollers 25 of each section, may be mounted on a common axle such as a plain cylindrical shaft, journaled in bearings in plates 24; or each plate may simply carry an outwardly projecting stub shaft on which the corresponding roller is journaled. Either construction is satisfactory. Thus, where a common axle is used, rollers 25 are identical in size and shape with rollers 32 shown at Figure 2. The only difference is that rollers 25 have a round central hole snugly fitting their axle shafts, instead of the square central hole of rollers 32.

The upper left rollers are somewhat different in construction and mounting. At this corner as shown at Figure 2 each plate 24, 24' has an aperture within which fits the outer race 27 of an antifriction bearing 28, whose inner race 29 has a square opening to receive a correspondingly square shaft 30. The bearing may be retained in place by retaining rings 31. Figure 2, shows the rear end of the shaft 30 of the first section, for example, and the forward end of shaft 30' of the second section. The roller 32 is a duplicate of the rollers 25 except that it has a square central opening to fit the shaft 30. Shaft 30' is journaled in the same manner as by bearing 28', as shaft 30 and the same reference characters, primed, have been used to designate corresponding parts. Hence detailed description is unnecessary. However, roller 33, in addition to flanges, has gear teeth on its central portion, in mesh with teeth 11 of its track so that, as the shaft is rotated, the section is positively rotated on its tracks 2. The end of shaft 30 projects beyond roller 32 about two-thirds of the distance separating 32 and 33, and carries a sleeve 34 having a squared center opening 35 with a smooth fit. This sleeve has a plunger 36 extending through a radial hole in the sleeve to engage either of two notches 37 in the end of shaft 30. A leaf spring 38 is attached at one end to sleeve 34 and has its other end bearing on plunger 36 to urge the same into one or the other of the notches to thus yieldingly hold the sleeve in a first position where it is free of the adjacent end of shaft 30' or in a second position where it engages over the end of 30'. Thus, by sliding the sleeve, the two shafts 30 and 30' may be coupled or uncoupled as desired and the sleeve is positively held in selected position.

It will be understood that each incubator section has a squared shaft and that each shaft 30, 30' etc., is journaled at both ends, with a roller 32 at its rear end and a roller 33 at its forward end. Thus, when all sleeves are slid to the right as viewed in Figure 2, all squared shafts are connected for rotation in unison and all incubator sections are oscillated in synchronism. Furthermore, by sliding any sleeve to the left, all sections to the left may be oscillated, while those to the right remain at rest. In this way, any selected number of sections may be oscillated without moving the remaining sections.

Figure 3:
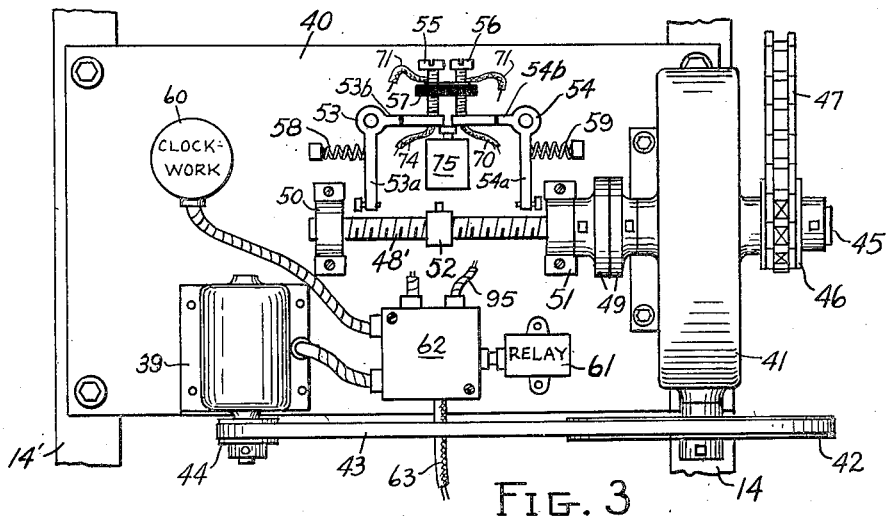
Figure 3 is an elevation substantially on line 3—3, Figure 1, showing the details of the motor control and speed reducing drive to the incubator sections.

Power means are provided for oscillating the sections. This means, in the model shown, is a reversible motor 39 bolted to a base 40 which, in turn, is bolted to the verticals 14, 14', of the first incubator section. The base may be of metal or heavy plywood as shown at Figure 3, also carries the speed reducer and control auxiliaries for the motor. The speed reducer is shown as a conventional worm and gear device 41 bolted to the base 40 and having an input shaft to which is fixed a relatively large pulley 42 driven from a smaller pulley 44 on the shaft of motor 39, by a V-belt 43. The output shaft 45 of speed reducer 41 has a sprocket 46 fixed on one projecting end thereof. A chain 47 extends about this sprocket and a sprocket 48 of about equal size, fixed to the squared forwardly projecting end of the squared shaft 30 of the first incubator section. Thus, as motor rotates in one direction or the other the first section and any subsequent sections connected therewith by sleeves 34, are oscillated at greatly reduced speed, about axis 3.

Control means are provided to periodically energize the motor to oscillate the sections through a predetermined angle, about 45°, first in one direction and then in the other, as is necessary for the hatching of the eggs. This means includes a threaded shaft 48' directly coupled by flanges 49 with the left projecting end of shaft 45 as viewed in Figure 3. The shaft is journaled in bearings 50 and 51 bolted to base 40 and carries a nut 52 held against rotation by any suitable means not shown, such as a rod mounted below shaft 48' with its ends fixed in the base of bearings 50, 51 and passing with a smooth fit through the lower portion of the nut.

A pair of bell cranks 53 and 54 are pivoted on base 40, as shown and have downwardly projecting arms 53a and 54a, each provided with a contact screw having its end in the path of a projection on nut 52. The horizontal arms 53b and 54b have electrically insulated ends each carrying a contact which, when the cranks are in the position shown, engage respectively, fixed contact screws 55 and 56 threaded through an insulating block 57 fixed to base 40. The cranks are urged into contact closing position by springs 58 and 59 acting between arms 53a, 54a, and abutments on base 40. A combined reversing and selection switch 75 is mounted on base 40 with its actuating plunger positioned directly beneath and in contact with the ends of both arms 53b and 54b. Thus, as nut 52 reaches the left end of its travel, crank 53 is pivoted to separate the contact on arm 53b from contact 55 and, substantially simultaneously, to depress the plunger of switch 75, reverse the circuit through motor 39 and transfer control of the motor to the other bell crank and contact. When nut 52 reaches the right limit of its travel, it engages and pivots crank 54 to thereby separate its arm 54b from contact screw 56 and, substantially simultaneously actuate the plunger of switch 75.

An electrically controlled contact closing clockwork 60, is conveniently mounted on base 40, together with a relay 61 and a junction box 62. Conventional cable leads, which may be armored, lead from the junction box to the motor, clock, contacts and relay. A flexible cable 63 extends from junction box 62 to a lead in and master switch box 64 and supply cable 65.

Figure 4:
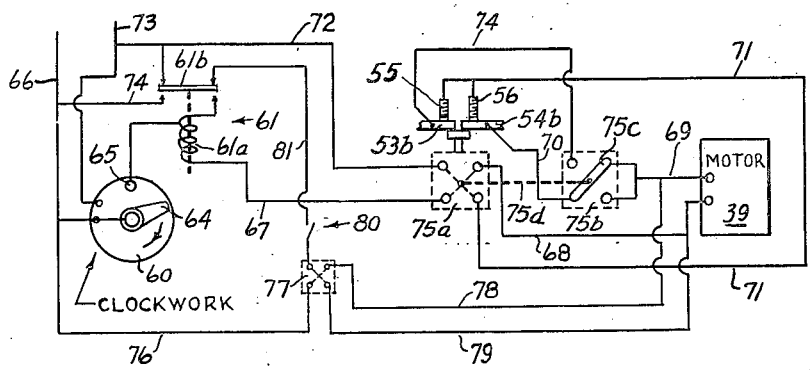
Figure 4 is a wiring diagram corresponding to Figure 3.

The circuit is shown at Figure 4 where it will be noted that clockwork 60 includes a contact arm 64 rotated to periodically close the circuit by contact at 65. This period is approximately two hours, but it is contemplated that a known type of clockwork may be used wherein means are provided for varying the rotational period as desired. Alternatively a mechanical spring-driven clock may be used if desired.

As previously intimated, switch 75 comprises two sections, first, a reversing switch 75a and a selection switch 75b. The switch is a well known ratchet-type instrument wherein when its plunger is actuated once, it reverses the contacts in section 75a while simultaneously rotating through 90°, an arm 75c in section 75b. In Figure 4 the operating connection between the two sections is indicated by dotted line 75d. The connections and proportions are such that when nut 52 reaches the left end of its travel, the frames 13 then connected by sleeves 34, are in their limiting position of counter-clockwise rotation. Conversely, when the nut reaches its right limit of travel, said incubator sections are in their limiting position of clockwise rotation.

Assuming that the incubator is loaded and the desired number of sections are connected by sleeves 34, the switch is closed to supply current and start clock 60. Motor 39 remains at rest since the relay contacts controlling the same, are open. Arm 64 now rotates and at the end of a certain time closes the circuit at 65. Current now flows through line 66, arm 64, contact 65, the coil 61a of relay 61, lead 67, two contacts of section 75a, lead 68, motor 39, lead 69, arm 75c of switch section 75b, lead 70, arm 54b, contact 56, lead 71, the remaining two contacts of reversing switch section 75a connected at that time and lead 72 to the other side 73 of the supply line. Relay coil 61a is then energized to establish a holding circuit from line 66, lead 74, relay bar 61b, through coil 61a and the circuit previously traced.

Motor 39 now rotates and pivots the incubator sections clockwise. Simultaneously nut 52 is translated to the right. When the incubator sections have reached the desired limit of clockwise rotation, nut 52 engages and pivots crank 54 to thereby separate arm 54b from contact 56 and break the circuit, whereupon relay 61 opens as coil 61a is de-energized. At substantially the same instant arm 54b actuates switch 75 to reverse the contact connections in section 75a, and pivot arm 75c through 90°, to thereby transfer circuit control to arm 53b and contact 55. Arm 64 having moved off its contact 65, the incubator sections remain in limiting position of clockwise rotation until the arm again engages contact 65 to close the circuit and establish a holding circuit through relay 61, as previously described. Because of the new position of switch sections 75a and 75b, current now flows from line 66, lead 74, relay arm 61b, solenoid 61a, lead 67, switch section 75a, lead 71, contact 55, arm 53b, lead 74, arm 75c of selector switch 75b, lead 69, motor 39, lead 68, the remaining two contacts of reversing switch 75a, and lead 72 to the other side 73 of the supply. A holding circuit is established as before and motor 39 now rotates in the reverse direction to move the incubator sections counter-clockwise 45° to the other limiting position. The incubator sections connected for oscillation are thus moved at selected intervals in a manner which will hatch the maximum number of eggs.

At times, as when eggs are to be loaded, or chicks removed, it is necessary to rotate the sections to central position wherein all track sections 20, 21, 22 and 23, are in alignment. For this purpose a manual control is provided by making relay 61 a double throw instrument so that its bar 61b is spring-pressed upwardly, except when solenoid 61a is energized, to close a circuit which may be traced from line 66, lead 76, a reversing switch 77, leads 78 and 69, motor 39, lead 79, switch 77, circuit switch 80, lead 81, relay bar 61b and lead 72 to the other side 73 of the line. Thus at any time except when solenoid 61a is energized, switch 77 may be thrown for the desired direction of rotation of motor 39, and switch 80 closed to cause the motor to rotate until the track sections are in central, aligned position. Since the speed reducer 41 has a high reduction ratio, it is irreversible and acts to hold the sections positively in whatever position they have at the time motor 39 is de-energized.

The general external appearance of a seven-section machine, is indicated at Figure 5 where the entrance and exit tracks may be supported at floor level, by framework generally indicated at 82 and 83. The ends of the housing 1 are provided with pairs of doors 84 and 85 whereby the housing may be closed. In Figure 5 an egg truck or rack 86 is moved part way into the incubator.

Referring to Figure 1, it will be noted that each truck comprises a simple frame built up of angle sections and provided with bearings 87, axles 88, and flanged wheels 89 by which the truck may be easily moved along the tracks. The trucks are provided with superposed angles 89', 90, etc. (Fig. 6) secured to each corner upright as by welding whereby trays 91 may be slid into the truck from the ends to load the same. Means are provided at the sides of each truck to prevent the trays from sliding out of the truck when the frames are oscillated.

The trucks, when loaded into the incubator are spaced to provide a central passageway. Flooring sections 92 are secured to the lower horizontals 17 to provide a walk along which an operator may pass to inspect the eggs or to move trucks from one section to another. At the top of each section, a fan 93 is mounted on a plywood base 94 secured across and centrally of the top horizontals 16 of the section. The fans may be supplied by cables, not shown, from a lead 95, Figure 3. The cables between fans have a length sufficient to enable all fans to be driven while one or more sections are not being oscillated. Or disconnectable couplings may be provided so that the fans of the sections not being oscillated, are not driven.

Heating means are provided, conventionally shown as steam or hot water coils 96, 97 supported and maintained in relation by fairleads 98 supported from horizontals 16 by brackets 99 and 100. The coils of each section are separate from those of the other sections and are connected by flexible hose couplings such as 101 with supply and exhaust headers 102 and 103. Valves 104, 105 between the headers and each flexible hose coupling are provided to enable heat to any coil section to be turned off. Alternatively electric heating coils may be employed. At the bottom, water evaporating pans 106, 107 are provided supplied from headers 108 and 109, controlled by valves 110, 111, respectively at the front of the machine. See Figure 5. Ventilating louvres such as 112, Figure 5, are provided at each end. The effective opening of these may be varied by any suitable mechanism, under control of a knob 113.

Headers 102 and 103 are adapted, by means not shown, for selective connection either with a source of hot water, or with a source of cooling liquid, whereby the temperature within the incubator may be fully controlled at all times.

In operation where continuous production of chicks is desired, as at three-day intervals and where a seven-section incubator is used, first and second trucks are loaded and moved into the first section. The sleeve 34 between this and the second section is moved to uncoupled position, and the master switch closed. At the end of three days, third and fourth trucks are loaded, the first and second sections are coupled by sleeve 34, the first two trucks are moved into the second section and the third and fourth trucks are moved into the first section. This procedure is repeated at three-day intervals until the entire seven sections are loaded. However, when this procedure is followed, in accordance with well known procedure, the seventh section remains uncoupled so that the eggs are quiet for the last three days before hatching. At the end of twenty-one days the eggs in the first and second trucks have hatched and these trucks are moved out through doors 85. Thus, continuous production is possible with a batch of chicks being hatched at intervals dependent upon the number of incubator sections employed and the number of trucks loaded into the machine at each interval. If desired one truck may be loaded into the machine at one and one-half day intervals instead of two at three-days intervals.

Alternatively, all sections may be loaded at the same time, coupled for oscillation by sleeves 34 and rocked for eighteen days, when the power to motor 29 is turned off.

I have thus provided a large-capacity incubator which, while relatively simple and inexpensive to produce, is highly efficient and flexible in operation. Because the egg trucks may be loaded and then run directly into the machine the expense of transferring egg trays from one part of the incubator to another at the end of eighteen days, is eliminated. Numerous other ways of using the incubator, will occur to those skilled in the art. Other types of poultry eggs may be hatched in the machine with equal efficiency. Because it is unnecessary to handle the eggs, the even temperature at which they are maintained and the smooth operation of the machine, a maximum percentage of hatched eggs is assured. Furthermore, incubator sections may be added at relatively low cost as the production requirements of the owner increase.

The fan 93 may be inverted from the position shown so that the motor thereof is above the blades. Any suitable bracket may be used for supporting the fan in such an inverted position, either on or underneath support 94.

While trucks 86 are shown at Fig. 1 as comprising a single stack of trays, it will be understood that this is merely one example, and that each truck may support two stacks of trays in side-by-side relation. In such a construction the two stacks would be spaced laterally, in a view corresponding to Fig. 1, and a partition would extend centrally and vertically between the two stacks. The trays are of standard construction with walls on all four sides to prevent the eggs and chicks from falling out.

While I have shown a preferred form of the invention as now known to me, numerous modifications and substitutions will occur to those skilled in the art, after a study of the present disclosure. A number of these have been suggested herein. For this reason, the disclosure is to be taken in an illustrative rather than a limiting sense. Within the scope of the subjected claims, all modifications, and substitutions of equivalents, are reserved.

Having now fully disclosed my invention, what I claim and desire to secure by Letters Patent is:

1. In an incubator, a housing, a frame in said housing, a plurality of aligned sections, means mounting said sections in contiguous aligned relation on said frame for rocking about a common axis, means operable to rock all or selected ones only of said sections about said axis from a single source of power, and track means carried within each section and forming a continuous track through said incubator when said sections are in predetermined rotational relation about said axis, said track means being adapted to support egg trucks within each said section.

2. In an incubator, circular track means having an open center, an open frame, rectangular in cross section mounted on and within said track means for rocking movement about the central axis of said track means, gearing between said track means and frame, means carried by said frame to support an egg truck therewithin and for movement along said axis and for rocking therewith, and power means connected to drive said gearing to rock said frame.

3. An incubator comprising a frame including a pair of circular tracks spaced along and concentric of a common axis, said frame carrying a circular rack, a generally rectangular open frame, wheels journaled at corners of said frame and riding on said tracks, gear means journaled on said frame and in mesh with said rack, means carried within said frame and extending parallel to and along said axis for guiding and supporting an egg truck for movement therealong, power means connected to drive said gear means, and means adapted to control said power means to rock said frame on said tracks first in one direction and then in a reverse direction.

4. An incubator as recited in claim 3, said power means comprising an electric motor, a circuit therefor, said control means comprising time mechanism periodically closing said circuit to operate said motor, and means responsive to the rotational position of said frame for opening said circuit.

5. In an incubator, a pair of circular tracks each comprising a channel member with inwardly-directed flanges, means mounting said tracks in fixed parallel spaced relation concentric of a common axis, said channel member having an arcuate rack fixed thereon concentric of said axis, a rectangular frame substantially fitting within said tracks, rollers on said frame journaling the same on said tracks for oscillation about said axis, one said roller including a gear in mesh with said rack, whereby rotation of said one roller effects pivotal movement of said frame, and track means carried within said frame in parallel relation with said axis for guiding an egg truck therealong.

6. An incubator as in claim 5, reversible power means, a driving connection between said power means and said gear, and means effecting periodical reversal of said power means to rotate said frame through a predetermined angle.

LOT J. SEACAT.

REFERENCES CITED

The following references are of record in the file of this patent:

UNITED STATES PATENTS

| Number | Name | Date |
|---|---|---|
| 855,871 | Axford | June 4, 1907 |
| 956,568 | Callaway | May 3, 1910 |
| 1,062,687 | Axford | May 27, 1913 |
| 1,301,208 | Wood | Apr. 22, 1919 |
| 1,662,139 | Whitlow | Mar. 13, 1928 |
| 1,800,208 | Bundy | Apr. 14, 1931 |
| 1,911,249 | Stover | May 30, 1933 |
| 1,911,250 | Stover | May 30, 1933 |
| 1,917,389 | Olsen et al. | July 11, 1933 |
| 1,982,827 | Olsen et al. | Dec. 4, 1934 |
| 2,078,443 | Clem | Apr. 27, 1937 |
| 2,152,492 | Needels | Mar. 28, 1939 |
| 2,327,888 | Hanson | Aug. 24, 1943 |
| 2,335,572 | Schroeder | Nov. 30, 1943 |

FOREIGN PATENTS

| Number | Country | Date |
|---|---|---|
| 138,573 | Austria | Aug. 25, 1934 |